United States Patent [19]

Garbuio

[11] 4,124,351
[45] Nov. 7, 1978

[54] APPARATUS FOR THE PRODUCTION OF BLOWMOLDED SYNTHETIC-RESIN BODIES

[75] Inventor: Franz Garbuio, Ettlingen-Schl., Germany

[73] Assignee: ELBATAINER Kunsstoff- und Verpackungsgesellschaft mbH, Ettlingen, Baden, Germany

[21] Appl. No.: 777,558

[22] Filed: Mar. 14, 1977

[30] Foreign Application Priority Data

Mar. 13, 1976 [DE] Fed. Rep. of Germany ....... 2610668

[51] Int. Cl.² .......................................... B29D 23/03
[52] U.S. Cl. .................................. 425/532; 425/466
[58] Field of Search ............... 425/532, 525, 381, 466, 425/465

[56] References Cited

U.S. PATENT DOCUMENTS 2,975,472  3/1961  Colombo ........................ 425/532 X
3,748,079  7/1973  Moreno et al. ...................... 425/466
3,947,201  3/1976  Ellwood ........................... 425/466 X
3,989,433  11/1976  Furman ........................... 425/466 X Primary Examiner—Richard B. Lazarus
Attorney, Agent, or Firm—Montague & Ross

[57] ABSTRACT

A parison of thermoplastic material is extruded through a nozzle, preliminary to blowing, the parison being receivable in a closable blowmold. The portions of the parison which are clamped in the blowmold should have a uniform thickness and, to compensate for different degrees of stretch at various locations, the parison-producing nozzle head is formed with a plurality of flaps or rollers selectively displaceable into the thermoplastic stream to reduce the wall thickness of the emerging parison. According to the invention, the wall thickness of the parison is only partially reduced at predetermined locations about the periphery, during predetermined time intervals in the course of the parison-extrusion process.

4 Claims, 7 Drawing Figures

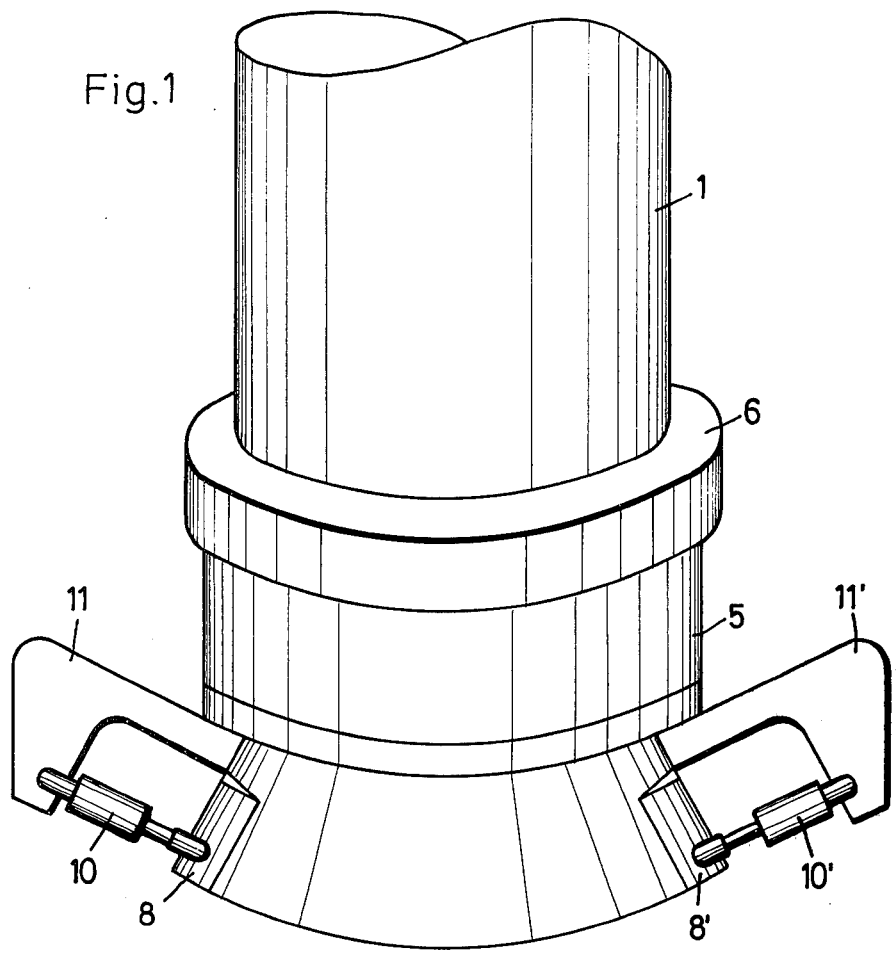
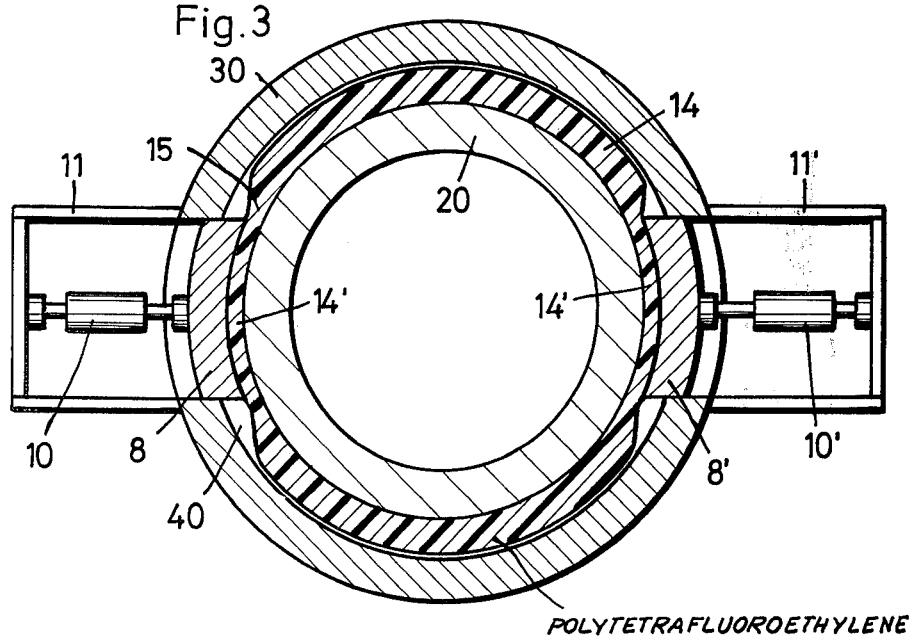

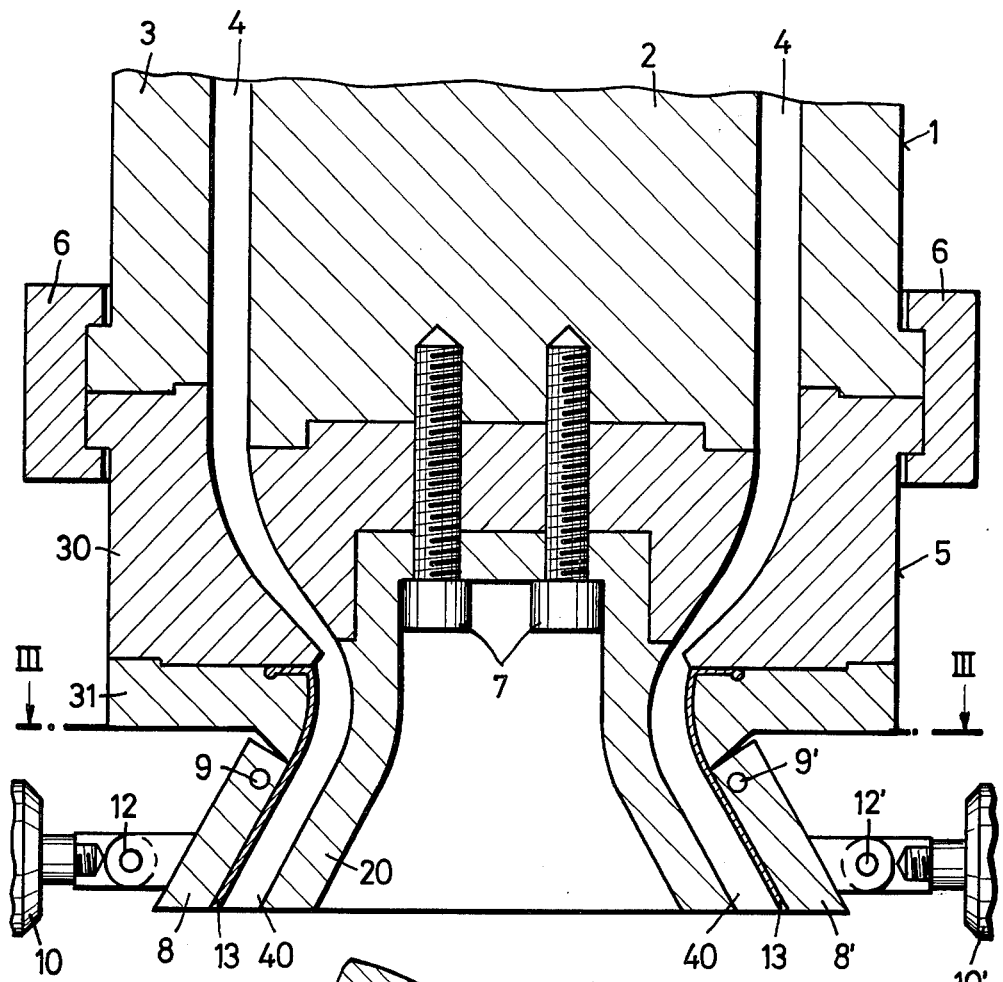
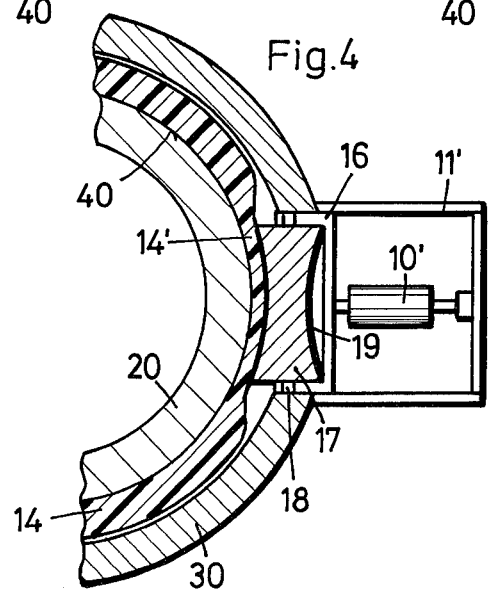

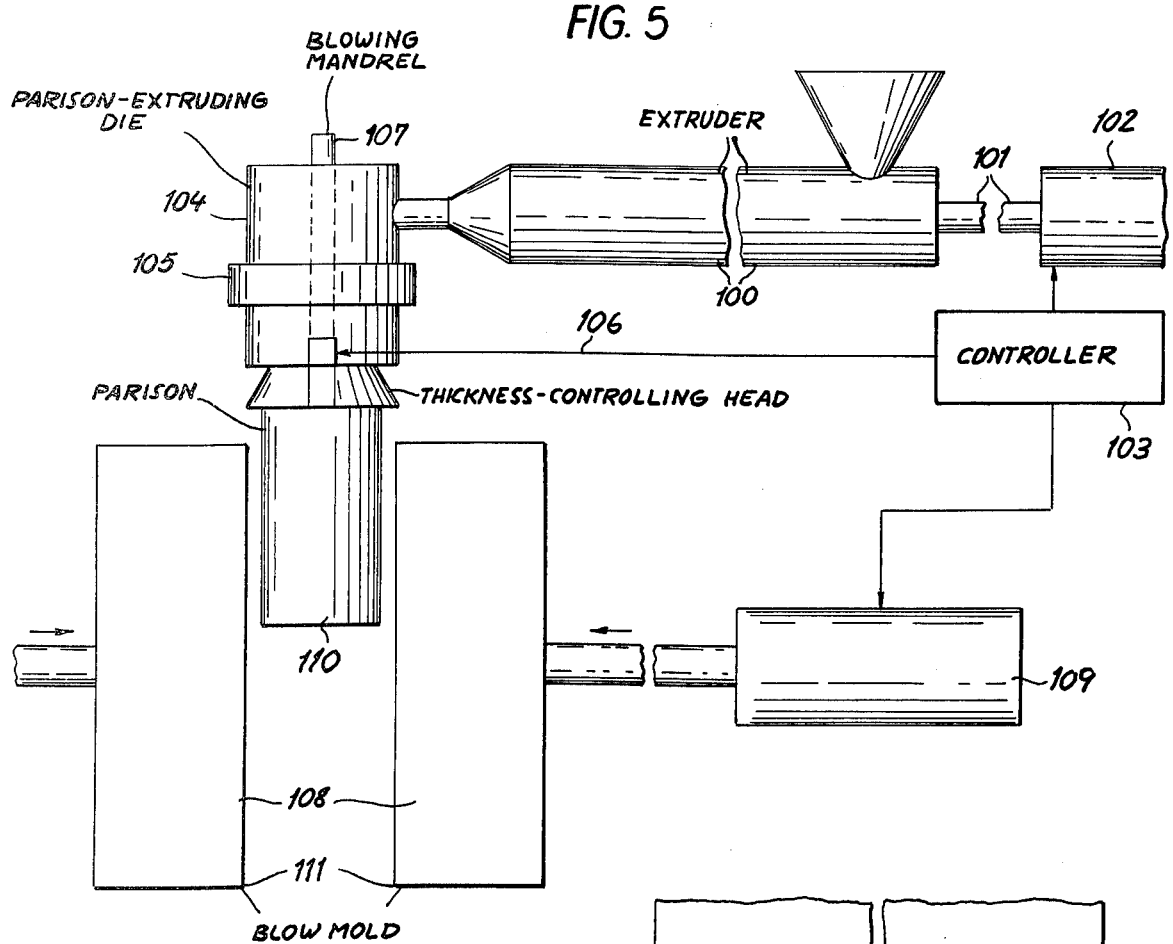
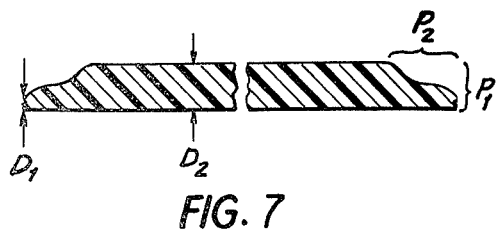
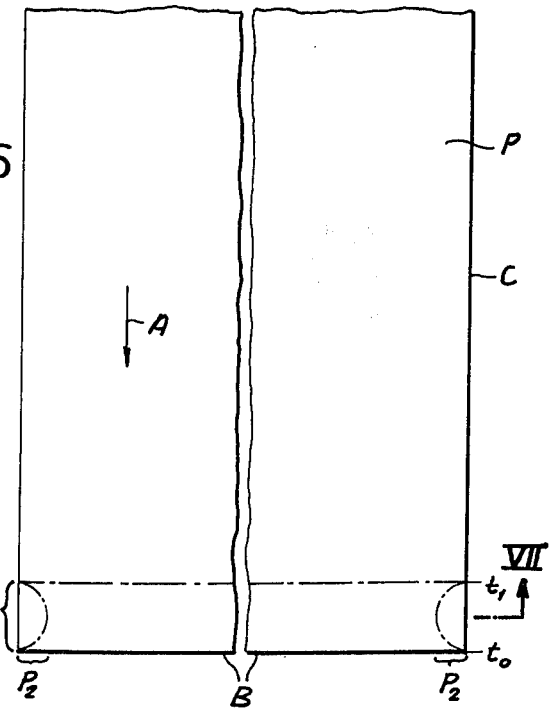

APPARATUS FOR THE PRODUCTION OF BLOWMOLDED SYNTHETIC-RESIN BODIES

FIELD OF THE INVENTION

The present invention relates to a method of and an apparatus for the production of blowmolded bodies from thermoplastic material, and, more particularly, to the generation of improved parisons for subsequent blowmolding in a closable blowmold.

BACKGROUND OF THE INVENTION

In blowmolding processes, it is a common practice to extrude a thermoplastic synthetic resin material through a nozzle head or die and thereby form an elongated parison of a certain wall thickness, the parison being clamped, after extrusion, in a closable blowmold. Gas is introduced under pressure to the interior of the parison, thereby expanding the same to conform to the contours of the cavity of the blowmold. The parison can be formed by feeding the thermoplastic material to the head from an extruder and is produced over a predetermined time period corresponding to the extrusion of the thermoplastic material of the parison through the head or die. The parison is usually tubular and can be engaged by edges of the blowmold, e.g., along the bottom of the parison, when the latter is extruded downwardly so that these edges of the blowmold close off the interior of the parison to enable the blowing thereof.

In the fabrication of large hollow bodies, such as canister and tubs or barrels, which can have volumes of 200 liters and more blowmolding techniques of the types described above are employed although practical application of the technique has been found to give rise to certain disadvantages. More specifically, the parison can be clamped between edges of the blowmold and then must be stretched outwardly to conform to the contours thereof, the clamping action thermally sealing or welding the corresponding edges of the parison together. During the blowing process, the degree of stretching varies along the walls of the parison, from a relatively small degree at the end of the sealed edge to a high degree at the center thereof, for example, and whereever, because of the contours of the production to be made, the parison walls then stretch equally. Consequently, the wall thickness of the product is nonuniform, i.e., the more highly stretched portions are thinner than the less highly stretched portions.

This is especially undesirable in the case of round hollow bodies, such as barrels, where the weld or seam formed by the clamped edges is linear and forms the bottom of the barrel. In this case, the parison assumes the configuration of a flat sack with a longitudinal weld seam at its bottom and the sack must be expanded outwardly (radially) while the bottom is stretched into a circular disk configuration. At the central regions of the weld seak, therefore, the synthetic resin material is stretched so greatly that a minimum wall thickness is formed precisely at the point at which weakening is most undesirable. In the outer corners of the parison there is practically no stretching and hence the original wall thickness of the parison remains practically intact. On the other hand, in the region of the center of the seam or weld, the synthetic resin material must stretch substantially over the entire radius of the barrel outwardly and in all directions, thereby forming the bottom of the barrel. A flow of the thermoplastic material from the regions of greater wall thickness to those of smaller wall thickness does not significantly occur and thus it is possible that the wall thickness of a finished hollow body, such as a barrel, can range between 12 mm at the low stretch regions to about 4 mm in the regions of higher stretch.

As a result, the original thickness of the parison must be sufficient to provide the minimum thickness in the low stretch region for the requisite mechanical stability of the hollow body. This leads to excessive wall thickness elsewhere and a higher than necessary consumption of material. Another disadvantage is that, with wall thicknesses greater than necessary, the cooling time must be increased and hence the production rate of the apparatus is limited.

To overcome these disadvantages, it has been proposed to provide the nozzle head with a core and a surrounding shell and to shift the core with respect to the shell and vice versa so that the flow cross section for the thermoplastic material forming the parison has different thickness at different portions of the length of the parison. Such a system is described in German published application DT-AS No. 15 04 03.3.

This, however, results in only a partial improvement since the variation in the wall thickness must extend over the entire periphery of the parison. This, however, does not eliminate the problem of excessive high degrees of stretch is not to occur or excessive dimensioning of the thickness of the seamed edge. In general, therefore, the problem has not been fully solved by the prior-art arrangement described above.

OBJECTS OF THE INVENTION

It is the principal object of the present invention to provide a method of and an apparatus for the blowmolding of thermoplastic material whereby the aforementioned disadvantages are obviated and large hollow bodies can be produced with a more uniform wall thickness by blowmolding.

Another object of the invention is to provide a method of controlling the wall thickness of a parison to be blowmolded so that the parison can be used to ultimately form blowmolded objects with uniform wall thickness and without excessive use of material.

Still another object of the invention is to provide an apparatus for producing improved blowmold objects and, more specifically, an apparatus capable of more economical production of blowmolded vessels of high volume.

SUMMARY OF THE INVENTION

These objects and others which will become more readily apparent hereinafter are attained, in accordance with the present invention, in a method which involves the extrusion of a parison from a nozzle head and, at predetermined locations about the periphery of the parison, but not over the entire periphery thereof, reducing the wall thickness of the parison and predetermined time intervals within the extrusion process.

A "predetermined time interval" can be defined as any period of time, usually less than the entire extrusion duration, commencing from the instant at which the parison first enters the region of the blowmold to the moment at which extrusion ceases and the parison is wholly within the region to be engaged by the blowmold.

The reduction of the wall thickness of the parison thus does not take place simultaneously over the entire periphery thereof but only locally, i.e., at one location along the periphery or at a plurality of spaced apart locations therearound, and generally does not take place over the entire length of the blowmold. The reduction of the wall thickness of the parison, more specifically, is effected substantially only in those regions in which the blowmold clamps the parison and in those regions in which minimum or no stretch is applied to the parison during the subsequent blowing step. The remainder of the parison, which can be subjected to greater degrees of stretch, can have unreduced wall thickness.

The invention also applies to an apparatus for carrying out the process in which the usual nozzle head of the worm extrusion press is provided with an additional head (auxiliary head) having one or more surfaces defining the flow channel of the thermoplastic material which can be displaced to constrict the respective regions of the channel or cross section. According to a feature of the invention, the wall portion can be formed by a flap which can be swung by a fluid responsive device to reduce the cross section locally. Alternatively, the wall can be formed by a roller which can also be swingably mounted or simply displaceable on a support generally radially to locally constrict the flow passage.

In order to ensure that the movable wall and the member carrying same does not present sharp edges to the flow of the thermoplastic and thereby give rise to defects in the parison, it has been found to be advantageous to provide the wall as a flexible bar or apron which is deformed inwardly by the movable member, i.e., the flap or the roller.

The apron or bar can be composed of steel and is preferably provided with a temperature and chemical resistant coating, e.g., of polytetrafluoroethylene. This coating can be applied along the exterior of the apron to reduce the frictional contact between the bar and the movable member and/or along the inner surface of the apron to reduce frictional retardation of the thermoplastic stream contacting same.

When the flap is used, it may be swingable mounted at its upper end upon the auxiliary nozzle hed and is preferably displaceable about a pivot axis which lies generally tangentially to the cross section of the head. The auxiliary head may also carry a support for a piston-and-cylinder arrangement whose movable member can be connected to the flap by a uniform or ball joint to a uniform, ball or hinge joint to shift the flap inwardly and outwardly. A solenoid-type electrical actuator can be used alternatively. When the roller is provided, it may be freely rotatable upon an axis lying generally tangential to the cross section of the auxiliary head and can have a ball-shaped or concave curved surface which defines the aforementioned wall of the flow passage. The roller may be mounted in a frame which, in turn, can be displaceable by the hydraulic or pneumatic cylinder arrangement or the electrical actuator described above. Since the roller can be freely rotatable, it has a minimum frictional retardation effect upon the thermoplastic material and hence the steel band can be omitted. In this case, the low friction layer of polytetrafluoroethylene can be applied to the surface of the roller in contact with the thermoplastic material.

The system of the present invention has the important advantage that it permits more uniform contours of large dimensions made, thereby increasing the quality of the vessels and reducing the amount of material necessary. The cooling time is thereby reduced, the output of the apparatus is increased, and production costs are lowered.

BRIEF DESCRIPTION OF THE DRAWING

The above and other objects, features and advantages of the present invention will become more readily apparent from the following description reference being made to the accompanying drawing in which:

FIG. 1 is a diagrammatic perspective view of the nozzle head of an extruding press provided with the auxiliary nozzle and flaps for partial reduction of the cross section of the extrusion channel at selected time periods according to the invention;

FIG. 2 is a longitudinal (axial) cross-sectional view through a portion of the head of FIG. 1;

FIG. 3 is a cross section taken along the line III — III of FIG. 2;

FIG. 4 is a section similar to that of FIG. 3 but illustrating another embodiment of the invention;

FIG. 5 is an elevational view, in diagrammatic form, illustrating the apparatus in accordance with the principles of the invention;

FIG. 6 is an elevational view of a portion of a portion of a parison according to the invention; and FIG. 7 is a section taken along the line VII — VII of FIG. 6 of a part of the wall of the flattened parison.

SPECIFIC DESCRIPTION

Referring first to FIGS. 6 and 7, from which the principles of the present invention may become more readily understandable, it will be observed that the parison P can have a normal thickness $D_2$ except in regions in which this thickness is reduced selectively. The parison is normally extruded downwardly (arrow A) so that the start of the parison extrusion process, at which the lower edge B emerges, is represented at time $t_0$. According to the invention, from time $t_0$ to a time $t_1$ (or any other time as required during the extrusion process), there can be a reduction in the cross section of the extrusion channel from which the parison emerges, e.g., by the manipulation of the flaps or rollers described previously. As a result, the wall thickness of the parison is locally reduced over the region $P_2$ and in this region has a thickness $D_1$. Prior to the activation of the flaps or roller, i.e., in the zone $P_1$, the parison can have a constant wall thickness over its entire periphery. FIGS. 6 and 7 have been given only to illustrate the significance of the timing of activation during the extrusion process. The principle is also applicable to a system in which, e.g., at the opposite longitudinal edges C of the parison, in which the region $P_1$ is to be clamped by the blow mold, flaps or the like are provided to reduce the parison thickness over the region $P_1$ since the stretching is less pronounced in this region when, for example, a barrel is to be produced. With the system of the present invention, therefore, the flaps or rollers are provided wherever a reduction in the parison thickness would be advantageous and the flaps are activated so that the reduction in parison thickness takes place only over those portions of the length of the parison as may be required or desirable.

In FIG. 5 I have shown an apparatus which comprises an extruder 100 which can have the usual worm displaceable by a ram 101 and a cylinder 102 with a timing determined by a controller 103. The parison extruding head or die 104 can be provided with a thickness-controlling head 105, i.e., the auxiliary head or die 5 described in connection with FIGS. 1-4, the fluid-responsive means of which can be operated by the controller 103 as represented by the line 106. A blowing mandrel 107 may be provided in the conventional manner to inflate the parison within the blow mold which is here represented by the mold halves 108 which are displaceable by cylinders such as the one shown at 109, operated by the controller 103. The sequence of operations thus is conventional except for the thickness-controlling head.

The ram 101 displaces the thermoplastic material from the extruder 100 through the head to form the parison 110 which is, upon its completion, clamped in the blow mold 108 so that the bottom edge 111 of the blow mold seals the bottom of the parison. Through the mandrel 107, compressed there is introduced to expand the parison to the configuration of the blow-mold cavity, i.e., a barrel configuration, thereby stretching the walls of the parison. In the usual manner, and as not described and shown in detail, the mold article is cooled and removed from the blow mold.

In the present system, however, the controller 103 operates the thickness-controlling flaps or roller whenever the corresponding portion of the length of the parison is to have a reduction in thickness. This obviates the disadvantages of the earlier systems described.

Referring now to FIGS. 1–4, it will be seen that the apparatus of the present invention can comprise a conventional nozzle head 1 of a worm press, which has not been illustrated, provided with a nozzle core 2, a nozzle shell or housing 3, and a nozzle passage 4 traversed by the thermoplastic material. An auxiliary nozzle 5 is mounted at the discharge end of the nozzle head 1 by a clamp ring 6 and screws 7.

The auxiliary nozzle 5 also comprises a nozzle core 20, a nozzle shell or housing 30 and a nozzle passage 40 corresponding to the parts of the normal nozzle head 1.

Flaps 8 and 8' are mounted on the lower part 31 of the nozzle housing 30 of the auxiliary nozzle 5 and are pivotal about respective pivot axes 9 and 9' at their upper ends. Each of the flaps 8 and 8' is activated by a piston-and-cylinder arrangement 10 or 10' fixed in holders 11 and 11' on the lower part 31. Hinges 12 and 12' compensate for the tilting movement of the flaps when the latter are swung into the nozzle passage 40. A continuous (peripherally closed) steel apron 13 in the form of a flexible steel band is fixed in the lower part 31 of the auxiliary nozzle 5 and extends to the mouth of the passage 40 which is thus surrounded by the apron over its entire length within the lower part 31. The apron is only fixed at its upper end by clamping its flange between the upper and lower parts 30, 31 so that its lower portion is readily deflected inwardly.

In FIG. 2, the flaps 8 and 8' are in their normal positions and do not locally obstruct the flow cross section of the passage 40. When, however, the flaps 8 and 8' are swung inwardly (see FIG. 3) they reduce the cross section of the nozzle passage 40 and thus impart to the parison a reduction in wall thickness in the regions of the flaps 8 and 8', i.e., in the regions which are to be clamped in the blow mold, and for a duration or time interval corresponding to the duration for which the flaps 8 and 8' are swung inwardly. Thereafter the flaps are displaced inwardly into their normal positions (FIG. 2).

The steel band apron 13 follows the movements of flaps 8 and 8' and, because of its elasticity, provides a uniform transition 15 between the reduced wall thickness and the full wall thickness portions 14' and 14 of the parison, respectively. The surface 15' of the apron is covered with polytetrafluoroethylene. This coating prevents scoring of the parison and hence the formation of score marks on the resulting hollow body.

FIG. 4 shows another embodiment of the invention in which, instead of the flaps 8 and 8', each of the piston and cylinder arrangements, e.g., that shown in 10', has a bracket 16 supporting a roller 17 freely rotatable about its axis 18 and swingable into the passage 40. In this case, the apron 13 is eliminated and the roller 17 itself directly reduces the flow cross section of the process.

The roller 17 can, as illustrated, have a recessed (concave) periphery although it can also have a ball-shaped surface. It can, of course, also be coated with a chemically or thermally resistant layer as described.

In the embodiment illustrated, of course, the flaps or rollers can be provided wherever local thickness reduction will be necessary and hence all locations at which the parison is expanded minimally or not at all. These locations, as noted, usually correspond to the regions at which the parison is clamped in the blow mold.

Corresponding to the form of the hollow body to be made, more than two flaps or rollers can be provided and any desired program can be established by the controller for operating them together or alternatively. The system can also be used in combination with systems for control of the thickness of the parison over its entire periphery, e.g., as described in the aforementioned German published application.

I claim:

1. An apparatus for the blow-molding of a hollow body comprising:
   an extruder for displacing thermoplastic material;
   a nozzle head connected with said extruder for forming a parison from the displaced material;
   a blow mold receiving said parison for the blowing thereof to produce said body;
   an auxiliary nozzle mounted on said head and formed with a nozzle passage traversed by the thermoplastic material forming said parison; and
   wall means juxtaposed with only a portion of the periphery of said parison and displaceable into said passage to partially obstruct the same and reduce the wall thickness of the parison at a corresponding location for a predetermined time interval during the formation of the parison corresponding to the displacement of said wall means into said passage, said auxiliary nozzle having a flexible steel liner extending all around said passage, said wall means including a flap deforming only a portion of said liner inwardly and thereby bending said liner inwardly at said location.

2. The apparatus defined in claim 1 wherein said flap in swingable, further comprising a piston-and-cylinder device operatively connected to said flap for displacing same.

3. The apparatus defined in claim 2, further comprising a hinge connecting said device to said flap.

4. The apparatus defined in claim 1 wherein said liner is coated with polytetrafluoroethylene.

* * * * *